(12) United States Patent
Asahi et al.

(10) Patent No.: US 10,614,727 B2
(45) Date of Patent: Apr. 7, 2020

(54) MUSICAL INSTRUMENT PRACTICE SYSTEM, PLAYING PRACTICE IMPLEMENTATION DEVICE, CONTENT REPRODUCTION SYSTEM, AND CONTENT REPRODUCTION DEVICE

(71) Applicant: YAMAHA CORPORATION, Hamamatsu-shi (JP)

(72) Inventors: Yasuhiko Asahi, Iwata (JP); Yuji Takahashi, Hamamatsu (JP); Kenichi Shiba, Hamamatsu (JP); Jun Usui, London (GB); Kouki Hayafuchi, Hamamatsu (JP); Kenichi Yamauchi, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 16/242,335

(22) Filed: Jan. 8, 2019

(65) Prior Publication Data

US 2019/0147762 A1 May 16, 2019

Related U.S. Application Data

(63) Continuation of application No. PCT/JP2017/025554, filed on Jul. 13, 2017.

(30) Foreign Application Priority Data

Jul. 13, 2016 (JP) .................................. 2016-138383

(51) Int. Cl.
G09B 15/02 (2006.01)
G09B 15/00 (2006.01)
(Continued)

(52) U.S. Cl.
CPC ......... *G09B 15/023* (2013.01); *G06F 9/3004* (2013.01); *G09B 15/00* (2013.01);
(Continued)

(58) Field of Classification Search
CPC .... G09B 15/023; G09B 15/00; G10H 1/0016; G10H 2210/091; G10H 1/344; G10H 1/00;
(Continued)

(56) References Cited

U.S. PATENT DOCUMENTS

| | | | | |
|---|---|---|---|---|
| 5,885,085 A | * | 3/1999 | Fujita | ...................... G10H 1/365 340/901 |
| 7,053,288 B2 | * | 5/2006 | Iwai | ......................... A63C 5/06 280/87.042 |

(Continued)

FOREIGN PATENT DOCUMENTS

| | | |
|---|---|---|
| JP | 2005099844 A | 4/2005 |
| JP | 2015064586 A | 4/2015 |
| JP | 2015191429 A | 11/2015 |

OTHER PUBLICATIONS

International Search Report issued in Intl. Appln. No. PCT/JP2017/025554 dated Oct. 10, 2017. English translation provided.
Written Opinion issued in Intl. Appln. No. PCT/JP2017/025554 dated Oct. 10, 2017.
(Continued)

*Primary Examiner* — Jeffrey Donels
(74) *Attorney, Agent, or Firm* — Rossi, Kimms & McDowell LLP

(57) ABSTRACT

A content reproduction system includes a content reproduction device that reproduces a content in a movable room, an input device that accepts operation by a user responsive to the content, and a sensor that detects a disturbance acting to disturb the operation. The content reproduction device provides assistance to the user in response to a result of the detection by the sensor during reproduction of the content
(Continued)

while associating the assistance with the operation accepted by the input device.

16 Claims, 10 Drawing Sheets

(51) Int. Cl.
    *G10H 1/00*         (2006.01)
    *G10H 1/34*         (2006.01)
    *G10G 1/02*         (2006.01)
    *G06F 9/30*         (2018.01)

(52) U.S. Cl.
    CPC ................. *G10G 1/02* (2013.01); *G10H 1/00* (2013.01); *G10H 1/0016* (2013.01); *G10H 1/344* (2013.01); *G10H 2210/091* (2013.01); *G10H 2220/015* (2013.01); *G10H 2220/355* (2013.01); *G10H 2220/395* (2013.01)

(58) Field of Classification Search
    CPC ....... G10H 2220/355; G10H 2220/015; G10H 2220/395; G06F 9/3004; G10G 1/02
    USPC ....................................................... 84/477 R
    See application file for complete search history.

(56) References Cited

U.S. PATENT DOCUMENTS

| | | | |
|---|---|---|---|
| 9,208,764 B2 * | 12/2015 | Ghosh | H04L 67/42 |
| 9,767,705 B1 * | 9/2017 | Klapuri | G10H 1/0008 |
| 10,332,495 B1 * | 6/2019 | Mortensen | G10H 1/361 |
| 2001/0008100 A1 * | 7/2001 | Devecka | A63F 13/005 |
| | | | 84/738 |
| 2003/0117531 A1 * | 6/2003 | Rovner | G10H 1/361 |
| | | | 348/729 |
| 2004/0123726 A1 * | 7/2004 | Kato | G10H 1/0008 |
| | | | 84/609 |
| 2004/0170288 A1 * | 9/2004 | Maeda | H04R 5/04 |
| | | | 381/86 |
| 2005/0235809 A1 * | 10/2005 | Kageyama | G10H 1/0008 |
| | | | 84/601 |
| 2005/0252362 A1 * | 11/2005 | McHale | G10H 1/368 |
| | | | 84/616 |
| 2007/0234888 A1 * | 10/2007 | Rotolo de Moraes | |
| | | | G10H 1/361 |
| | | | 84/730 |
| 2010/0313736 A1 * | 12/2010 | Lenz | G09B 15/02 |
| | | | 84/477 R |
| 2015/0294656 A1 * | 10/2015 | Hanuschak | G06F 3/167 |
| | | | 84/453 |

* cited by examiner

MUSICAL INSTRUMENT PRACTICE SYSTEM, PLAYING PRACTICE IMPLEMENTATION DEVICE, CONTENT REPRODUCTION SYSTEM, AND CONTENT REPRODUCTION DEVICE

CROSS REFERENCE TO RELATED APPLICATIONS

The present application is a continuation application of International Patent Application No. PCT/JP2017/025554, filed on Jul. 13, 2017, which claims priority to Japanese Patent Application No. 2016-138383, filed on Jul. 13, 2016. The contents of these applications are incorporated herein by reference in their entirety.

BACKGROUND OF THE INVENTION

1. Field of the Invention

An embodiment of the present invention relates to a technique of reproducing a content in a movable room such as a vehicle.

2. Description of Related Art

As an example, Japanese published unexamined patent application No. 2005-99844 discloses a musical amusement system by which, even a beginner unable to read musical scores can enjoy playing easily. According to this system, a user is allowed to enjoy playing by pressing keys while following musical notes displayed in a scrolled fashion. Meanwhile, if timing mismatch occurs between the position of a musical note being displayed in a scrolled fashion and key press, this timing mismatch is determined to be false playing. Then, a warning is issued, for example. Such a system is applicable not only for amusement purposes but also for practice of playing, for example.

The foregoing system can be constructed in a movable room such as a vehicle, for example. In this case, if the movable room is accelerated or decelerated during playing in the movable room, the playing may be disturbed or it may become difficult to continue the playing. More specifically, a user (player) or a musical instrument may be shaken from front to back or from side to side by the acceleration or deceleration, so that mismatch may be caused between proper timing of key press intended by the user and timing of actual key press. In this case, the foregoing system determines the timing mismatch to be false playing, and issues a warning. However, this determination does not always reflect the intention of the user (player) correctly. Such a false determination may also occur in implementing a content such as a game or karaoke in a movable room in which some judgement is given on operation by the user.

According to the foregoing system, even if it becomes difficult to continue playing on the occurrence of acceleration or deceleration, scroll of a musical score (musical notes) still continues. This prohibits the user from playing a part having been scrolled out. Such a problem may also occur in implementing a content such as a game or karaoke in a movable room in which timing match is required between a user and an image being displayed in a scrolled fashion or music being output a speaker for example.

SUMMARY OF THE INVENTION

A content reproduction system according to an aspect of the present invention includes a content reproduction device that reproduces a content in a movable room, an input device that accepts operation by a user responsive to the content, and a sensor that detects a disturbance acting to disturb the operation. The content reproduction device provides assistance to the user in response to a result of the detection by the sensor during reproduction of the content while associating the assistance with the operation accepted by the input device.

BRIEF DESCRIPTION OF THE DRAWINGS

FIG. 6A is a display screen with a warning message; FIG. 6B is a display screen appearing if a playing permissible range is extended; and FIG. 6C is a display screen appearing if the practice content is stopped.

FIG. 7A is a display screen with a warning message; FIG. 7B is a display screen appearing if a playing permissible range is extended; and FIG. 7C is a display screen appearing if the practice content is stopped.

DETAILED DESCRIPTION OF THE EMBODIMENTS

The following describes a musical instrument practice system allowing practice of musical instrument playing in a vehicle (an example of a movable room) as an example of a content reproduction system. A driver and a fellow passenger may be required to stay for a long time in space in the vehicle according to a destination. In this case, while the driver concentrates on driving, the fellow passenger may desire to make effective use of time during travel. Additionally, in response to recent progress of research and development on an automatic driving technique for automobiles, the driver is expected to become free from driving not far in the future. Hence, making effective use of time of travel to the destination is a matter of a high degree of interest for both the driver and the fellow passenger.

For example, quality time in the vehicle during travel may be spent by a way of reproducing and enjoying a content in the vehicle. An example of such enjoyment may be given by practicing playing a musical instrument. However, practicing playing in the vehicle is influenced by circumstances peculiar to the vehicle. More specifically, travel by the vehicle is accompanied by acceleration and deceleration, so that an acceleration is generated on the vehicle while the vehicle is traveling. On the occurrence of shaking of a player or a musical instrument from front to back or from side to side as a result of the influence of this acceleration, even if the player tries to operate a key (an example of an operation element) responsive to an instruction in a practice content to match with designated key-press timing or key-release timing, the player is likely to press the key erroneously due to mishandling, for example. Further, if the shaking caused by the acceleration becomes serious, it becomes impossible in some cases to continue the playing. An embodiment described below relates to a musical instrument practice system capable of providing preferred playing practice even on the occurrence of acceleration or deceleration on a vehicle.

Figure 1:
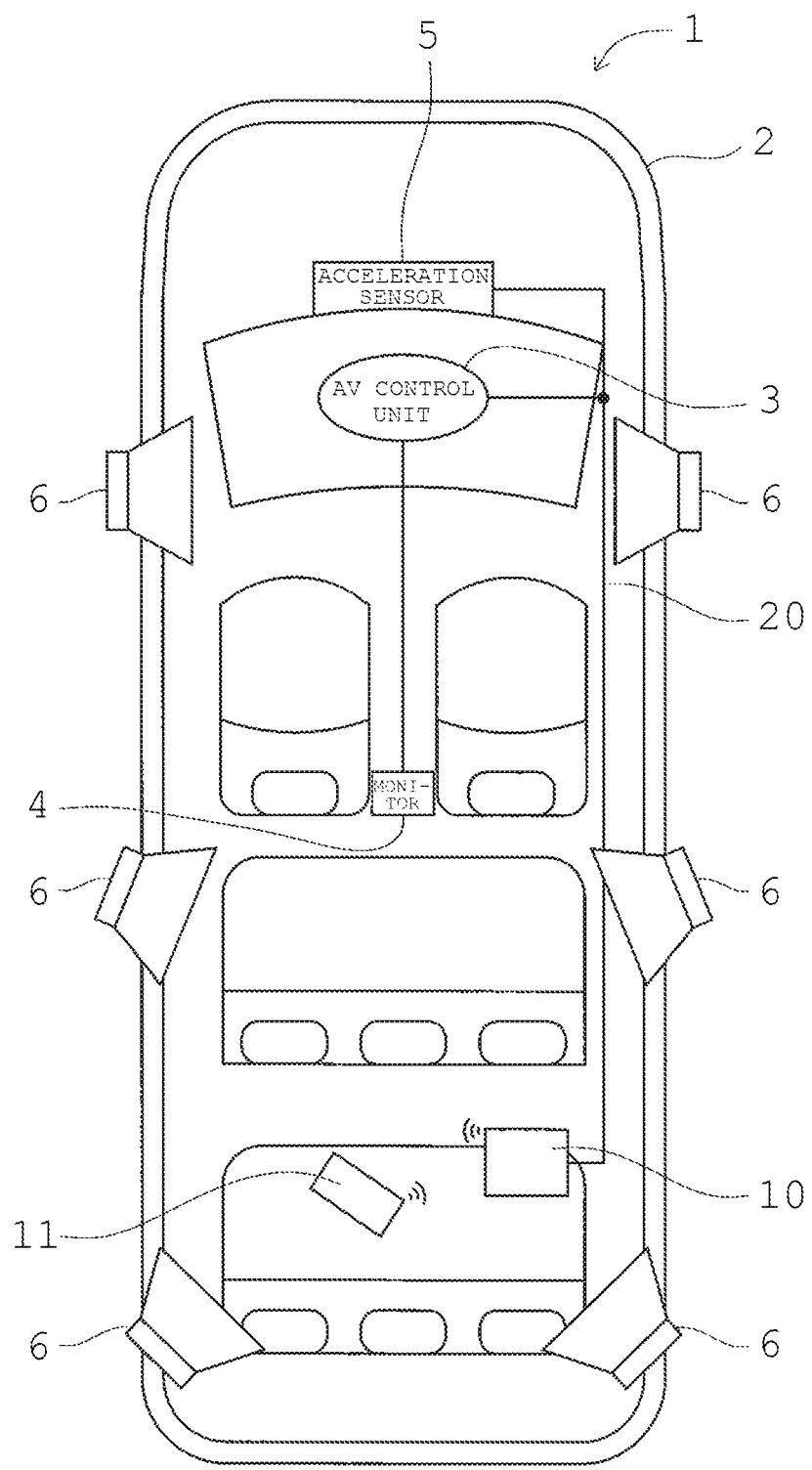
FIG. 1 is a schematic view showing the configuration of a musical instrument practice system constructed in a vehicle.

FIG. 1 is a schematic view showing the configuration of a musical instrument practice system 1 constructed in a vehicle 2. As an example, the vehicle 2 is a three-row seat vehicle. The vehicle 2 is equipped with an AV control unit 3 that controls an AV/DVD device such as a car audio, a monitor 4 that displays an AV/DVD content implemented by the AV control unit 3, and a plurality of speakers 6 that convert a musical sound signal sent from the AV control unit 3 to sound. Six speakers 6 are provided in total at right and left positions of front-row seats, those of middle-row seats, and those of back-row seats as viewed in a direction in which the vehicle 2 travels. The vehicle 2 is further equipped with an acceleration sensor 5 (an example of a sensor installed on a movable room) that detects an acceleration generating during acceleration or deceleration on the vehicle 2. The AV control unit 3 and the acceleration sensor 5 are connected through a bus 20 to a portable information terminal 10 (an example of a playing practice implementation device).

A player practices playing with the portable information terminal 10 and a portable musical instrument 11 (an example of a musical instrument that transmits playing data) brought into the room of the vehicle 2. In this embodiment, the portable information terminal 10 and the portable musical instrument 11 are connected through wireless communication. Alternatively, the portable information terminal 10 and the portable musical instrument 11 can be connected through a wire.

Figure 2:
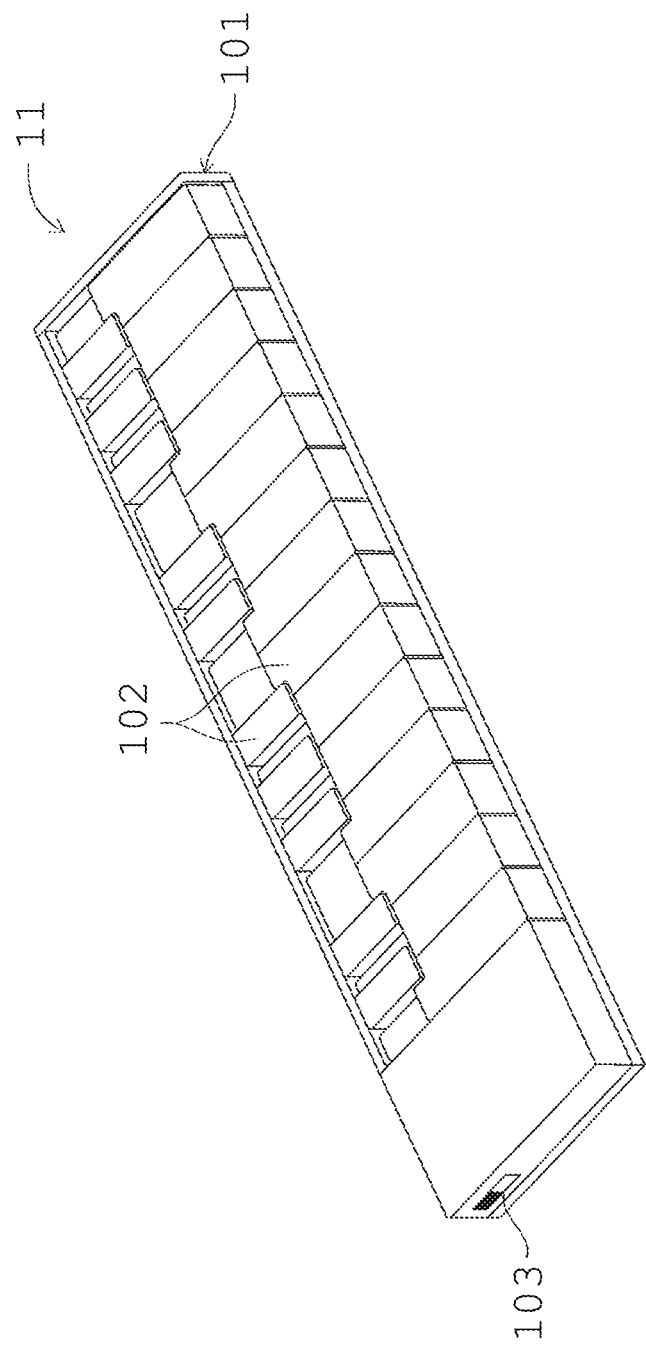
FIG. 2 is a perspective view of a portable musical instrument used in the musical instrument practice system.

FIG. 2 is a perspective view of the portable musical instrument 11 used in the musical instrument practice system 1. As shown in FIG. 2, the portable musical instrument 11 is an easy-to-carry portable electronic keyboard with keys 102 arranged at a compact housing 101. A remote control mode switch 103 is provided at a side surface of the portable musical instrument 11. The remote control mode switch 103 is a switch used for switching the keys 102 of the portable musical instrument 11 from normally used operation elements for musical instrument playing to operation elements for remote control. More specifically, by turning on the remote control mode switch 103 and changing to a remote control mode (an example of a remote control function provided to a musical instrument), a player becomes capable of using at least some of the keys 102 of the portable musical instrument 11 as remote control buttons for operating the portable information terminal 10, or an electronic device installed in the vehicle 2 such as the AV control unit 3 or the monitor 4.

In this configuration, the player can control the portable information terminal 10 or the device in the vehicle 2 from the portable musical instrument 11 while the player is in the vehicle 2. Since the portable musical instrument 11 is a portable device, the player can play the portable musical instrument 11 on any one of the seats in the three rows in the vehicle 2. As shown in FIG. 1, for example, if the player is on a seat in the back row, the player may be at a long distance to the electronic device installed on the vehicle 2 such as the AV control unit 3 or the monitor 4. In this case, by turning on the remote control mode switch 103, the player becomes capable of making various adjustments such as a pitch level or a balance between pitches while keeping the seated position, even from the seat in the back row.

Figure 3:
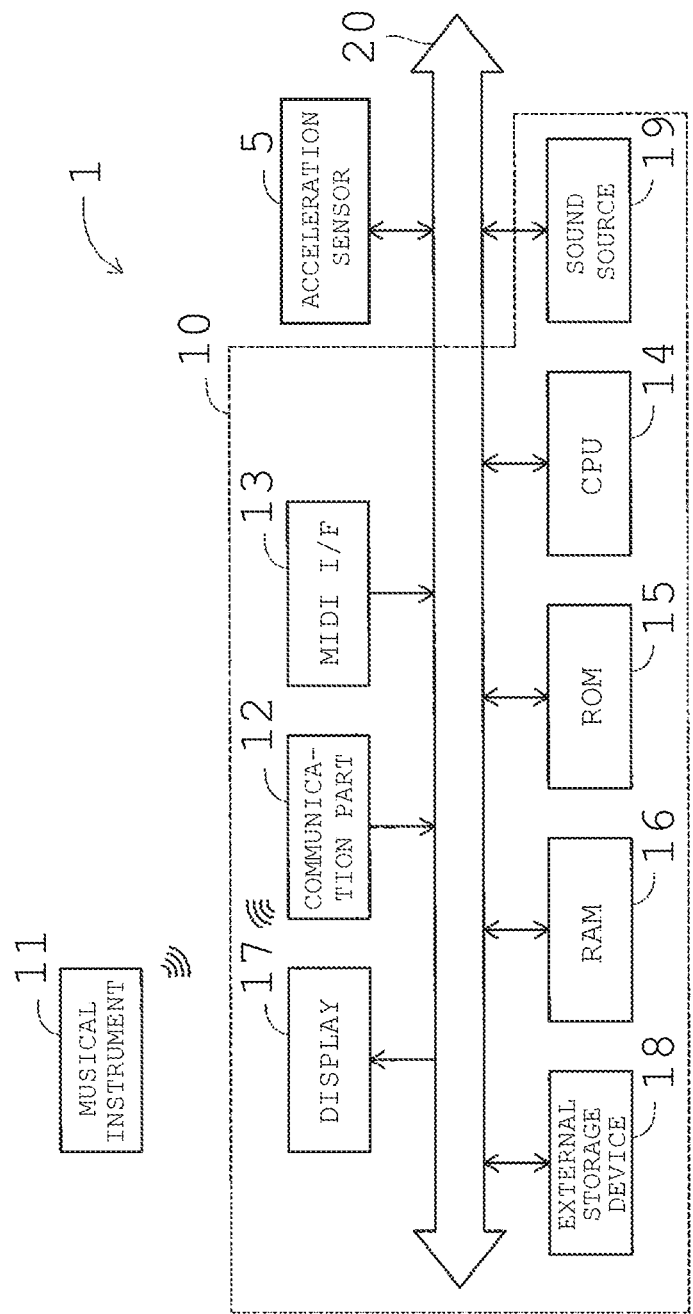
FIG. 3 is a block diagram showing the configuration of the musical instrument practice system.

FIG. 3 is a block diagram showing the configuration of the musical instrument practice system 1. The musical instrument practice system 1 includes the portable musical instrument 11 used by a player for playing, the portable information terminal 10 that receives MIDI (registered trademark) data as playing data from the portable musical instrument 11 through wireless communication, and the acceleration sensor 5 installed on the vehicle 2.

If the portable information terminal 10 and the portable musical instrument 11 are connected through a wire, playing data is transmitted through wired communication. The playing data is not limited to MIDI (registered trademark) data but can also be audio data. In other words, the musical instrument practice system 1 converts MIDI (registered trademark) data to audio data, if necessary, and emits sound from a speaker of the musical instrument practice system 1. In this case, the musical instrument practice system 1 can transmit the audio data or the MIDI (registered trademark) data to a different unit to which the speaker is connected, and emit sound from the speaker through the unit.

The portable information terminal 10 includes a communication part 12, an MIDI (registered trademark) I/F 13 (an I/F stands for an interface, and this will also apply to corresponding terms in the following), a CPU 14 (an example of an implementation controller), a ROM 15, a RAM 16, a display 17 (an example of a display part or a display device), an external storage device 18, and a sound source 19. The communication part 12 receives MIDI (registered trademark) data from the portable musical instrument 11. The MIDI (registered trademark) I/F 13 converts the MIDI (registered trademark) data received by the communication part 12 to audio data. The CPU 14 is responsible for control over the entire system. The ROM 15 stores a control program such as a practice content to be implemented by the CPU 14, control information to be used for display control described latter on the display 17, and others. The RAM 16 temporarily stores the practice content for implementation of playing practice, a result of calculation performed by the CPU 14, and others. The display 17 displays a situation of the playing practice made by following the practice content. The external storage device 18 is a memory card or a ROM cartridge, for example, and stores a plurality of practice contents. The sound source 19 converts the audio data obtained by the conversion by the MIDI (registered trademark) I/F 13 to a musical sound signal.

These units are connected to the common bus 20. The musical sound signal output from the sound source 19 is transmitted through the bus 20 to the AV control unit 3, and then output from the speakers 6 through the AV control unit 3. A storage device for the practice contents is not limited to the external storage device 18 but can also be a remote storage device accessible through a network such as a cloud.

The acceleration sensor 5 is connected to the bus 20. The acceleration sensor 5 transmits a signal responsive to a detection result about an acceleration to the CPU 14.

Figure 4:
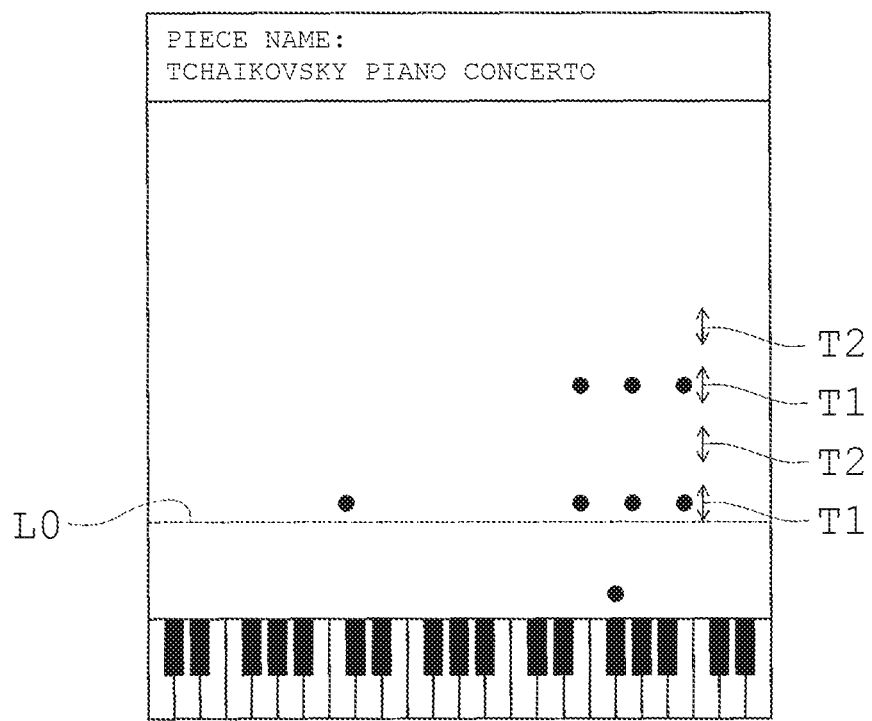
FIG. 4 shows an example of a display screen on a display of a portable information terminal appearing while a practice content is implemented.

FIG. 4 shows an example of a display screen on the display 17 appearing while a practice content is implemented. The display screen has an upper field where the substance of a practice content selected for playing practice is displayed. In FIG. 4, "PIECE NAME: TCHAIKOVSKY PIANO CONCERTO" is selected as the playing content, and the piece name is displayed in the upper field of the display screen. In addition to the piece name, various types of information relating to the substance of the playing content can be displayed appropriately in the upper field. For example, a composer name, a part to be played by a musical instrument for practice, a piece number and a date on which the piece was written if the piece is a self-composed piece, the name of a data file containing the practice content, or so on, can be displayed. The display field has a lower field where an operation element of a musical instrument for the playing practice is displayed. In FIG. 4, keys corresponding to those of the portable musical instrument 11 are displayed.

The display screen has a vertically wide region prepared as a center field. As a practice piece selected as the practice content proceeds, musical notes to be played (displayed as black circles in FIG. 4) are scrolled sequentially from top to bottom while being aligned with key positions displayed in the lower field. In the center field, a reference line L0 showing playing timing is arranged at a low position. A player plays the practice piece by pressing a key corresponding to a musical note having reached the reference line L0 among the sequentially scrolled musical notes.

In consideration of playing for practice, a certain duration (hereinafter called "permissible time") is preferably permitted to a player for each of key-press timing to press a key and key-release timing to release a finger from a key. As an example, the permissible time is indicated by an up-down arrow displayed at the right end of a row of musical notes in the center field. More specifically, permissible time T1 permitted for key-press timing is displayed at the right end of a row of musical notes. Permissible time T2 permitted for key-release timing is displayed between this row of musical notes and a next row of musical notes. Arrows showing the permissible time T1 and the permissible time T2 are scrolled together with musical notes to allow the player to check the duration permitted for each of key-press timing and key-release timing. The player presses keys while the arrow of the permissible time T1 crosses the reference line L0, and releases fingers from the keys while the arrow of the permissible time T2 crosses the reference line L0. This allows the player to play with correct timing.

A correctly played musical note is erased from the display 17 after a finger is released from a corresponding key. By contrast, an erroneously played musical note is scrolled continuously without being erased and exceeds the reference line L0 to be left at a low position. This allows the player to check the erroneously played musical note. This section of the display screen in which the erroneously played musical note remains unerased is an example of a mistake display part of the display 17.

The foregoing processing of implementation corresponds to processing in a main routine. The CPU 14 selects one practice content from a plurality of practice contents stored in the ROM 15 or the external storage device 18 and implement it, thereby realizing the foregoing processing.

Figure 5:
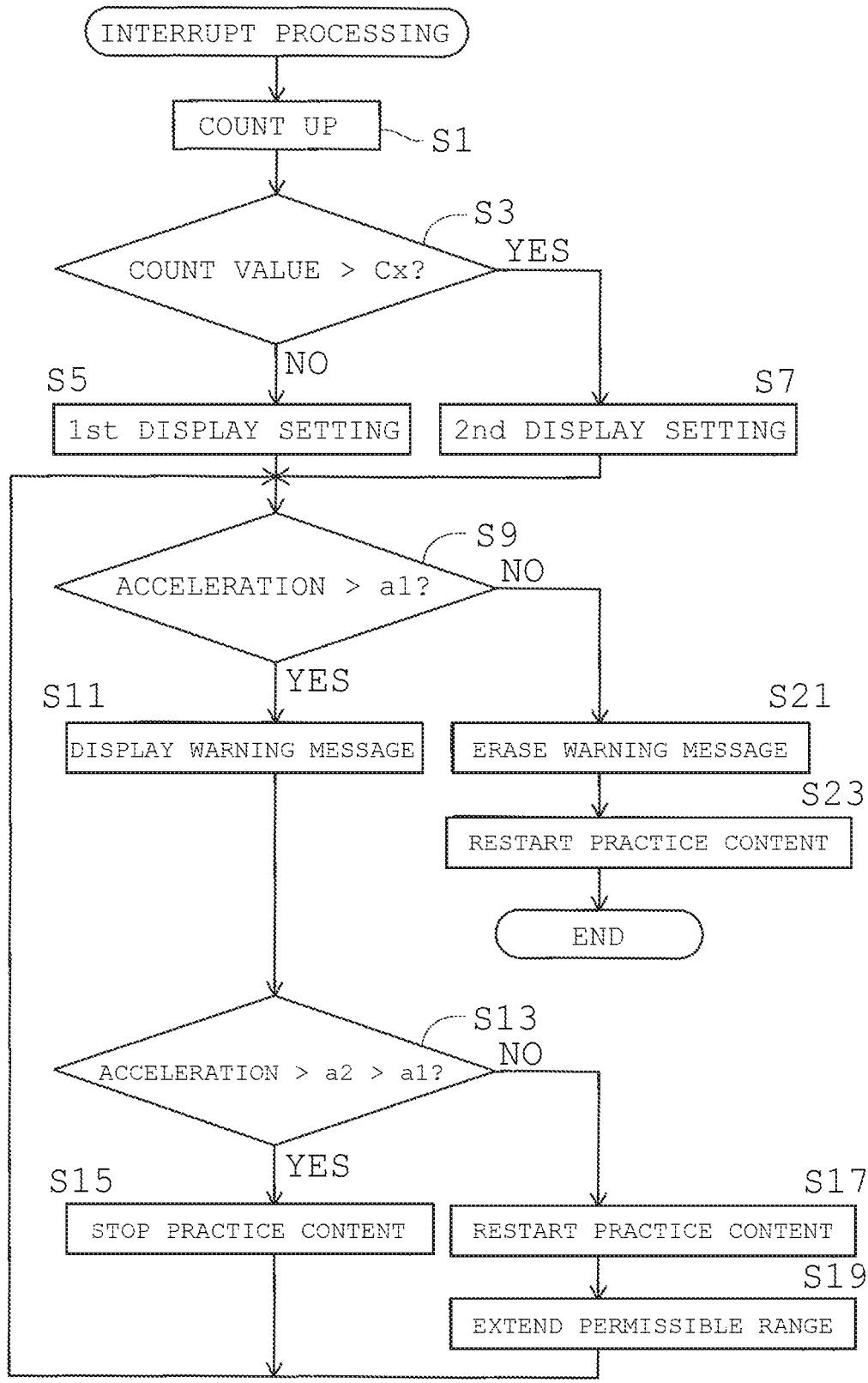
FIG. 5 is a flowchart showing interrupt processing performed in response to the occurrence of an acceleration on the vehicle.

Described next is interrupt processing performed on the occurrence of an acceleration on the vehicle 2 as an interrupt in the main routine being performed. FIG. 5 is a flowchart showing the interrupt processing. During implementation of the foregoing processing in the main routine, the CPU 14 determines whether the acceleration on the vehicle 2 exceeds a first predetermined value a1 based on a signal output from the acceleration sensor 5. If the CPU 14 determines that the acceleration exceeds the first predetermined value a1, the CPU 14 starts the interrupt processing.

First, the CPU 14 counts up the number of times the acceleration was determined to exceed the first predetermined threshold value a1 and the interrupt processing was started (step S1). "Counting" mentioned herein is to measure the frequency of excess of the acceleration over the first predetermined value a1. The frequency can be a frequency from start of playing or a frequency in every predetermined period for example. If the count value does not exceed a reference value Cx determined in advance (step S3: N), the CPU 14 determines that the acceleration will not exceed the first predetermined value a1 frequently, and then makes first display setting (step S5). By contrast, if the count value exceeds the reference value Cx (step S3: Y), the CPU 14 determines that the acceleration will exceed the first predetermined value a1 frequently, and then makes second display setting (step S7). In each of the first display setting and the second display setting, a message relating to the acceleration is set.

Figure 6A:
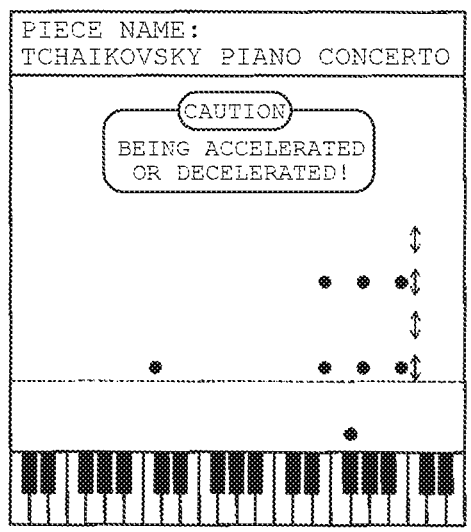
FIGS. 6A to 6C show display screens with messages set by first display setting.
Figure 6B:
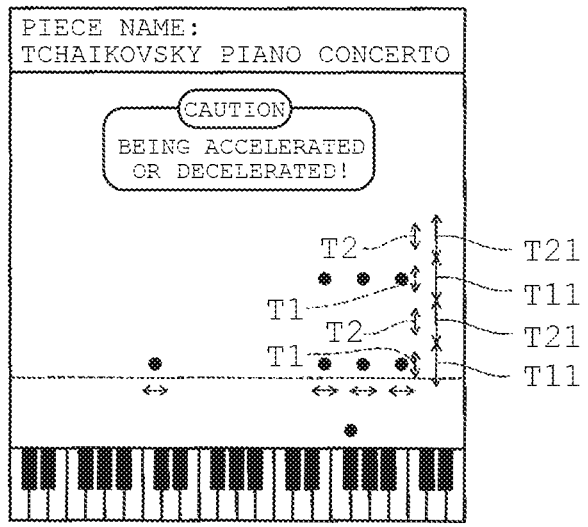
Figure 6C:
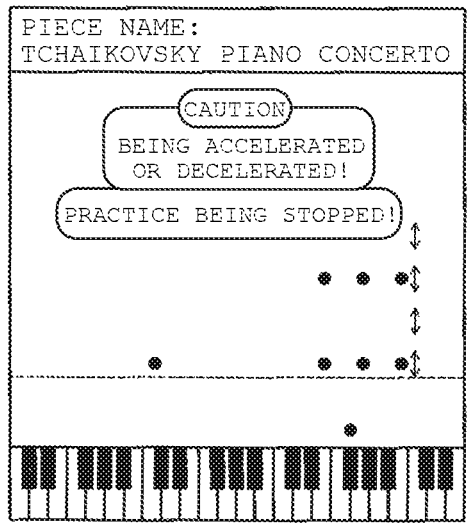
Figure 7A:
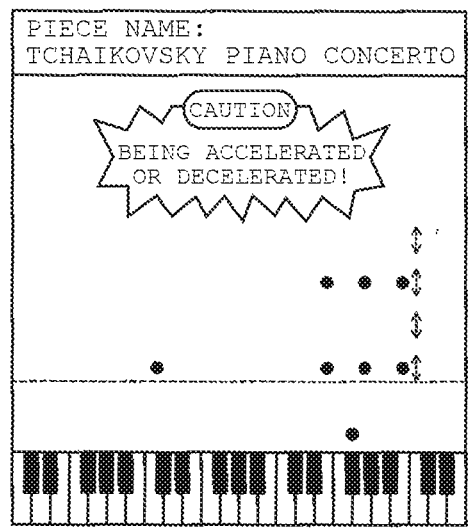
FIGS. 7A to 7C show display screens with messages set by second display setting.
Figure 7B:
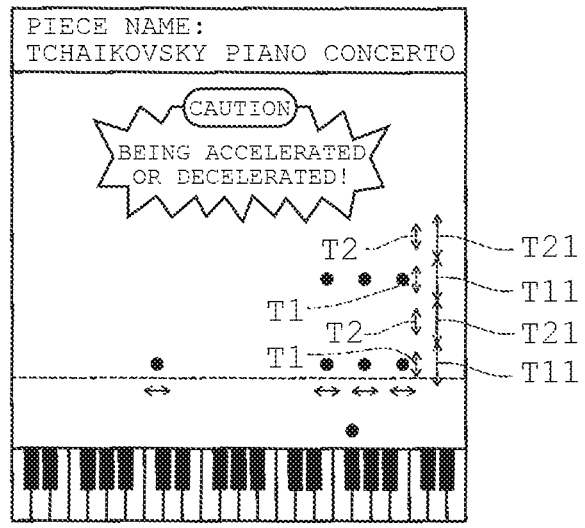
Figure 7C:
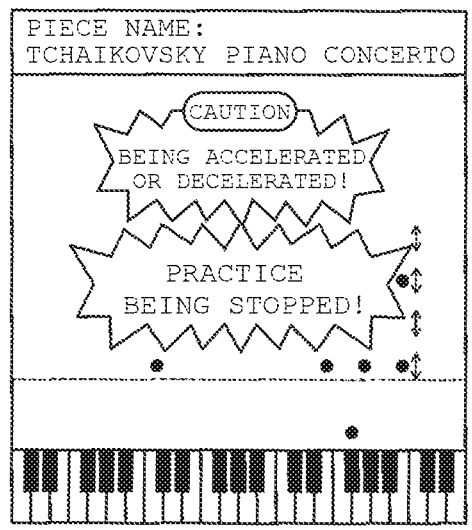

FIGS. 6A to 6C show display screens with messages set by the first display setting. FIGS. 7A to 7C show display screens with messages set by the second display setting. These display screens contain messages indicating that the vehicle 2 is being accelerated or decelerated. The display screens set by the second display setting contain messages giving an alert more strongly than messages contained in the display screens set by the first display setting.

After the message is set in step S5 or S7, the CPU 14 determines whether the acceleration exceeds the first predetermined value a1 (step S9). If step S9 is performed immediately after the message is set, this implementation of step S9 is immediately after start of the interrupt processing in response to a determination that the acceleration exceeds the first predetermined value a1. Thus, in this case, the acceleration is determined to exceed the first predetermined value a1 in step S9 (step S9: Y). Then, the CPU 14 displays the message (warning message) set in step S5 or S7 on the display screen on the display 17 (step S11).

The message set in step S5 is a standard message for alerting the player if the acceleration is not to occur frequently (see FIG. 6A). Meanwhile, the message set in step S7 is an emphasized message for alerting the player strongly if the acceleration is to occur frequently (see FIG. 7A). Each of FIGS. 6A and 7A shows an example of a displayed message "CAUTION: BEING ACCELERATED OR DECELERATED!". In FIG. 7A, this message is displayed in an emphasized fashion by being surrounded by a serrated frame.

After the message is displayed in step S11, the CPU 14 determines whether the acceleration exceeds a second predetermined value a2 larger than the first predetermined value a1 (step S13). If the CPU 14 determines that the acceleration exceeds the second predetermined value a2 (step S13: Y), the CPU 14 stops implementation of a practice content (step S15). With the acceleration exceeding the second predetermined value a2, it can be determined that the player or the portable musical instrument 11 is being shaken so intensively that the player finds difficulty in continuing playing.

The CPU 14 notifies the player of stop of implementation of the practice content by displaying a warning message (for example, "CAUTION: BEING ACCELERATED OR DECELERATED!") and a different indication (for example, "PRACTICE BEING STOPPED!") together with and below the warning message on the display screen on the display 17. More specifically, to stop implementation of the practice content while the warning message set by the first display setting is displayed, stop of the implementation is notified in a standard display style, as shown in FIG. 6C. Meanwhile, to stop implementation of the practice content while the warning message set by the second display setting is displayed, stop of the implementation is notified in an emphasized display style, as shown in FIG. 7C.

If the CPU 14 determines that the acceleration does not exceed the second predetermined value a2 (step S13: N), and if implementation of the practice content has been stopped, the CPU 14 restarts implementation of the practice content (step S17). If implementation of the practice content has not been stopped, step S17 is skipped and step S19 is performed. Whether implementation of the practice content is to be restarted can be determined based on a value different from the second predetermined value a2 in consideration of hysteresis, for example. The basis for the determination in step S13 (second predetermined value a2 or a value different from the second predetermined value a2) is an example of a third predetermined value.

Implementation of the practice content is restarted not only in step S17 but can also be restarted automatically if a condition for determining that practice is feasible is fulfilled. Alternatively, implementation of the practice content can be restarted in response to an instruction from the player. Further, for the restart, the CPU 14 can go back to a position before a position at which implementation of the practice content has been stopped, and then restart implementation of the practice content.

In step S19, the CPU 14 changes a duration for key-press timing permitted to achieve correct playing from the normal permissible time T1 to longer permissible time T11, thereby relaxing a determination about key press (namely, a determination criterion for determining key press) (see FIGS. 6B and 7B). In step S19, the CPU 14 further changes a duration for key-release timing permitted to achieve correct playing from the normal permissible time T2 to longer permissible time T21, thereby relaxing a determination about key release (namely, a determination criterion for determining key release).

A determination about key press or key release (namely, a determination about playing) can be relaxed by increasing a target of key press or key release in such a way that the target includes a key to be pressed originally or from which a finger is to be released originally and a key adjacent to this key (namely, by extending a range of a key to be pressed or from which a finger is to be released) (see FIGS. 6B and 7B), instead of or in addition to the foregoing making of the change in permissible time.

After the CPU 14 performs each of steps S15 and S19, the CPU 14 returns to step S9 and performs the processing from step S11 repeatedly until a determination that the acceleration does not exceed the first predetermined value a1 can be made in step S9. If the CPU 14 determines that the acceleration does not exceed the first predetermined value a1 in step S9, the CPU 14 erases the warning message being displayed (step S21). And then, if implementation of the practice content has been stopped, the CPU 14 restarts implementation of the practice content (step S23). If implementation of the practice content has not been stopped, the CPU 14 skips step S23 and finishes the interrupt processing.

In the foregoing musical instrument practice system 1, steps S11, S15, S17, and S19 in the interrupt processing are examples of an assistance part realized by software in the CPU 14. The permissible time (permissible range) relaxed in step S19 is an example of a determination criterion for determining a playing mistake by a player and is also an example of a determination criterion for determining whether the playing mistake is to be displayed on the display 17 (display part). Step S15 is an example of a process of stopping implementation of a practice content. Step S17 is an example of a process of restarting implementation of the practice content. Step S11 is an example of a process of issuing a warning.

The musical instrument practice system 1 of the foregoing embodiment allows a player to practice playing the portable musical instrument 11 in the vehicle 2. More specifically, when the CPU 14 in the portable information terminal 10 implements a practice content, the substance of the practice content being implemented is displayed on the display 17. The player plays the portable musical instrument 11 by following the substance of the practice content displayed on the display 17. The portable musical instrument 11 transmits MIDI (registered trademark) data being played to the portable information terminal 10 through wireless or wired communication. The portable information terminal 10 determines whether the portable musical instrument 11 is being played correctly, for example, based on the received MIDI (registered trademark) data.

If the vehicle 2 is accelerated or decelerated, the acceleration sensor 5 detects an acceleration and outputs a signal. The portable information terminal 10 provides assistance to the player in practice in response to the signal from the acceleration sensor 5. Thus, even if the player or the portable musical instrument 11 is shaken from front to back or from side to side by the influence of the acceleration to prohibit the player from pressing a key or releasing a finger from a key with intended timing, this key press or key release is not determined to be false playing and the player is allowed to continue the playing practice. As a result, even on the occurrence of an acceleration on the vehicle 2 acting to prohibit playing by the player, it still becomes possible to provide a practice content appropriately to the player.

More specifically, if the acceleration exceeds the first predetermined value a1, the permissible time T1 permitted for key-press timing is extended to the permissible time T11 and the permissible time T2 permitted for key-release timing is extended to the permissible time T21, thereby relaxing a determination about a playing mistake by the player. If the acceleration exceeds the first predetermined value a1, a range of a key to be pressed or from which a finger is to be released is extended to relax a determination about a playing mistake by the player. Thus, even if the acceleration on the vehicle 2 is large so the player is forced to press a key or release a finger from a key erroneously, this key press or key release can still be prevented from being determined to be false playing. By doing so, mildness is added to display of a playing mistake on the display 17 to prevent this key press or key release from being displayed as false playing. In this way, the musical instrument practice system 1 relaxes the determination about the playing mistake or adds the mildness to display of the playing mistake, thereby providing assistance to the player. Therefore, it is not necessary for the player to perform operation for relaxing the determination or adding the mildness.

If the acceleration exceeds the first predetermined value a1, the extended permissible time T11 permitted for key-press timing, the extended permissible time T21 permitted for key-release timing, an extended key range for the key press, or an extended key range for the key release is displayed on the display screen on the display 17. This allows the player to recognize that a determination about a playing mistake has been relaxed.

If the acceleration exceeds the second predetermined value a2, implementation of a practice content is stopped. More specifically, if the acceleration on the vehicle 2 becomes larger to exceed the second predetermined value a2, implementation of the practice content is stopped. This prevents only the practice content from proceeding while the player finds difficulty in continuing the playing as a result of the large acceleration on the vehicle 2, so that a part of the practice content the player cannot practice for playing can be eliminated.

If the acceleration falls below the third predetermined value (in this embodiment, the second predetermined value a2), implementation of the practice content is restarted. More specifically, if the acceleration on the movable room decreases to a level falling within a playing permissible range to fall below the third predetermined value, implementation of the stopped practice content is restarted. This allows the player to practice playing the practice content without omission.

In this way, the player can practice all programs in the practice content reliably.

Further, a warning is issued if the acceleration exceeds the first predetermined value a1 (in this embodiment, a warning message is displayed). This allows the player to be notified of the risk of influence on the playing caused by the large acceleration on the vehicle 2. Namely, an alert can be given to the player. Thus, when the player plays while seeing the practice content on the display 17, the player becomes aware of the behavior of the vehicle 2 through the message to become capable of playing safely. A way of issuing the warning is not limited to display of a warning message on the display 17 but it can also be issuance of a warning sound.

In the musical instrument practice system 1, the portable musical instrument 11 is provided with the remote control mode switch 103. Namely, the portable musical instrument 11 has a remote control function. Thus, the player is allowed to use the keys of the portable musical instrument 11 as remote control switches by turning on the remote control mode switch 103. By doing so, the player becomes capable of controlling the portable information terminal 10 or a device in the vehicle 2 remotely from the portable musical instrument 11. In this way, the player can set a speaker volume or adjust an air conditioner, for example, while keeping a posture for playing.

The present invention should not be limited to the foregoing embodiment, but various modifications or changes are applicable to the present invention within a range not deviating from the substance of the present invention.

For example, instead of using the acceleration sensor 5, the amount of press of an accelerator pedal or a brake pedal can be detected for detecting acceleration or deceleration on the vehicle 2. In this case, a warning message to be displayed on the display screen on the display 17 can be changed from "BEING ACCELERATED OR DECELERATED!" to "ACCELERATOR PEDAL (BRAKE PEDAL) BEING PRESSED!", for example.

The foregoing musical instrument practice system is applicable not only to the vehicle 2 but also to various types of means of transportation that can be movable rooms including railroad trains, ships, and airplanes. The assistance (interrupt processing can be performed) can be provided to the player in practice based on not only a result of detection by the acceleration sensor 5 but also on a result of detection by a different sensor (namely, a signal output from the different sensor). For example, change in the position of a movable room can be detected using a GPS, and the assistance can be provided to the player using a result of the detection. If the movable room is means of transportation to move with a wheel, change in the position of the movable room can be detected by detecting the direction or rotation of the wheel or the behavior of a suspension, for example.

Then, the assistance can be provided to the player in response to a result of the detection. In this way, change in the position of the movable room can be detected by various methods, and the assistance can be provided to the player (interrupt processing can be performed) based on a result of the detection.

In the portable musical instrument 11, a split function can become effective by turning on the remote control mode switch 103. This split function is to split a keyboard region and to make a key in a particular region function as a remote controller. Further, a combination of particular keys to be pressed, a particular chord sequence, playing a particular melody, etc. can be associated with particular remote control inputs. Additionally, if the display 17 includes a plurality of displays 17, the portable musical instrument 11 can be set to function as a remote controller to be used for operation on a predetermined display.

In the foregoing embodiment, the playing practice implementation device is not only realized in the portable information terminal 10 but it can also be realized in the AV control unit 3.

Figure 8:
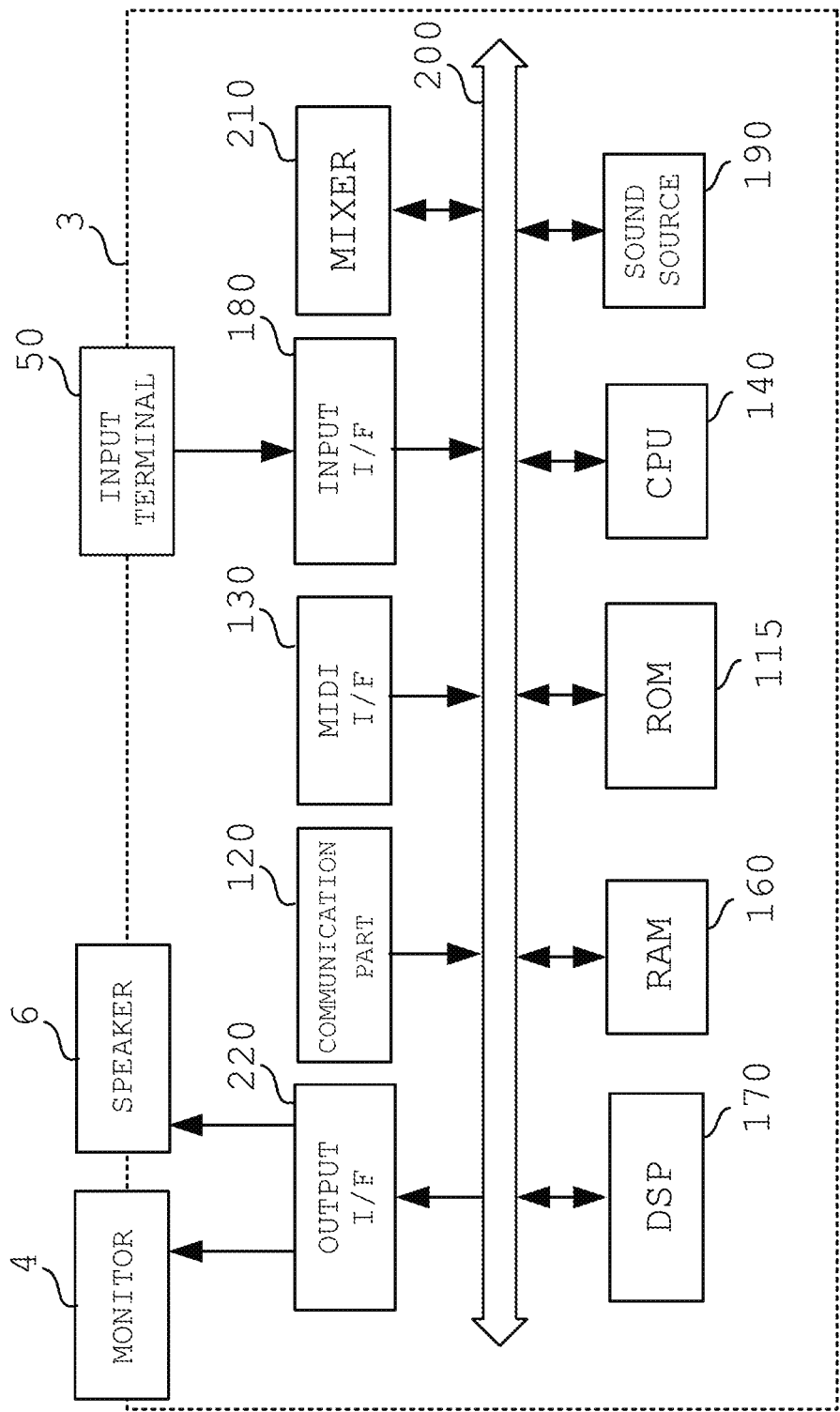
FIG. 8 is a block diagram showing the configuration of an AV control unit.

FIG. 8 is a block diagram showing the configuration of the AV control unit 3. The AV control unit 3 includes a communication part 120, an MIDI (registered trademark) I/F 130, a CPU 140, a ROM 115, a RAM 160, a DSP 170, an input I/F 180, a sound source 190, a bus 200, a mixer 210, and an output I/F 220.

The communication part 120, the MIDI (registered trademark) I/F 130, the CPU 140, the ROM 115, the RAM 160, the DSP 170, the input I/F 180, the sound source 190, the mixer 210, and the output I/F 220 are connected through the bus 200. An input terminal 50 is connected to the input I/F 180. The monitor 4 and the speakers 6 are connected to the output I/F 220.

The input terminal 50 is an input part to which an audio signal is input. For example, six input terminals 50 are provided in total at right and left positions of the front-row seats, those of the middle-row seats, and those of the back-row seats as viewed in a direction in which the vehicle 2 travels. The input terminals 50 are configured using USB I/Fs, for example. The input terminals 50 are connected to the portable information terminal 10 or an audio system such as the portable musical instrument 11 that outputs audio signals. The input terminals 50 are connected to various types of output terminals provided at the audio system, and the audio signals are input to the input terminals 50.

The MIDI (registered trademark) I/F 130 is connected to the portable musical instrument 11 and receives MIDI (registered trademark) data. The MIDI (registered trademark) data is input to the sound source 190. The sound source 190 converts the input MIDI (registered trademark) data to audio data.

The CPU 140 reads a program stored in the ROM 115 as a storage medium into the RAM 160, thereby controlling the AV control unit 3 in a centralized fashion.

For example, if an audio signal is output from the sound source 190, the CPU 140 inputs the audio signal to the mixer 210. If an audio signal is also input to the input I/F 180, the CPU 140 inputs the audio signal to the mixer 210.

The mixer 210 mixes the audio signal output from the sound source 190 and the audio signal input to the input I/F 180. In this case, a user can enjoy karaoke by connecting a microphone to the input terminal 50 and reproducing a musical content, for example. The CPU 140 inputs the audio signal resulting from the mixing at the mixer 210 to the DSP 170. The DSP 170 adjusts the sound level or sound quality of the input audio signal. The sound quality adjustment is adjustment of frequency characteristics, for example. The DSP 170 amplifies the audio signal after being adjusted in sound quality, and outputs the amplified signal to the output I/F 220. The CPU 140 controls the DSP 170 and the output OF 220 to control the sound levels and sound qualities of a plurality of audio signals individually to be supplied to the corresponding speakers 6.

The CPU 140 performs processing of implementing a practice content in the main routine to function as an implementation controller. Further, the CPU 140 performs the interrupt processing to function as an assistance part. More specifically, the CPU 140 selects one from a plurality of practice contents stored in a data site connected through the ROM 115, the sound source 190, or the communication part 120 and implements the selected practice content, thereby functioning as the implementation controller that performs processing of implementing the practice content in the main routine. Further, the CPU 140 starts the interrupt processing in response to a signal output from a sensor, thereby functioning as the assistance part that provides assistance to a player in practice.

The system described as an example of the content reproduction system in the foregoing embodiment is to assist a player in practicing playing a musical instrument. However, the content reproduction system is not only the system in the foregoing embodiment, but can also be a system to assist a user in operation while implementing a content such as a game or a karaoke in which the user is to receive some judgement.

More specifically, in trying to implement a content such as a game in a movable room in which timing match is required between a user and an image being displayed in a scrolled fashion on a display device and in which the user is to receive some judgement on the user's operation, a false determination may also be made by the influence of acceleration or deceleration on the movable room. Further, in trying to implement a content such as karaoke in a movable room in which timing match is required between a user and music being played through a speaker for example and in which the user is to receive some judgement on the user's operation such as singing (this judgement is scoring of the singing made by comparing the user's singing and a guide melody, for example), a false determination may also be made by the influence of acceleration or deceleration on the movable room. Thus, assistance (interrupt processing) can be provided to the user in operation in response to an acceleration on a movable room by a content reproduction device that reproduces contents including not only contents for practicing musical instruments but also karaoke, games, learning materials, etc., and a content reproduction system including the content reproduction device.

During implementation of a content, the foregoing false determination is also likely to be made not only on the occurrence of acceleration or deceleration on a movable room but also on the occurrence of a disturbance acting to disturb the user's operation such as vibration at the movable room, conversation in the movable room, external communication, or extraneous noise.

In this regard, the content reproduction system includes the content reproduction device (AV control unit 3, for example) that reproduces a content in a movable room, an input device (microphone, for example) that accepts operation by a user responsive to the content, and a sensor (acceleration sensor 5, for example) that detects a disturbance acting to disturb the operation by the user. While the content reproduction device reproduces the content, The content reproduction device provides assistance to the user in response to a result of the detection by the sensor during reproduction of the content while associating the assistance with the operation accepted by the input device.

Figure 9:
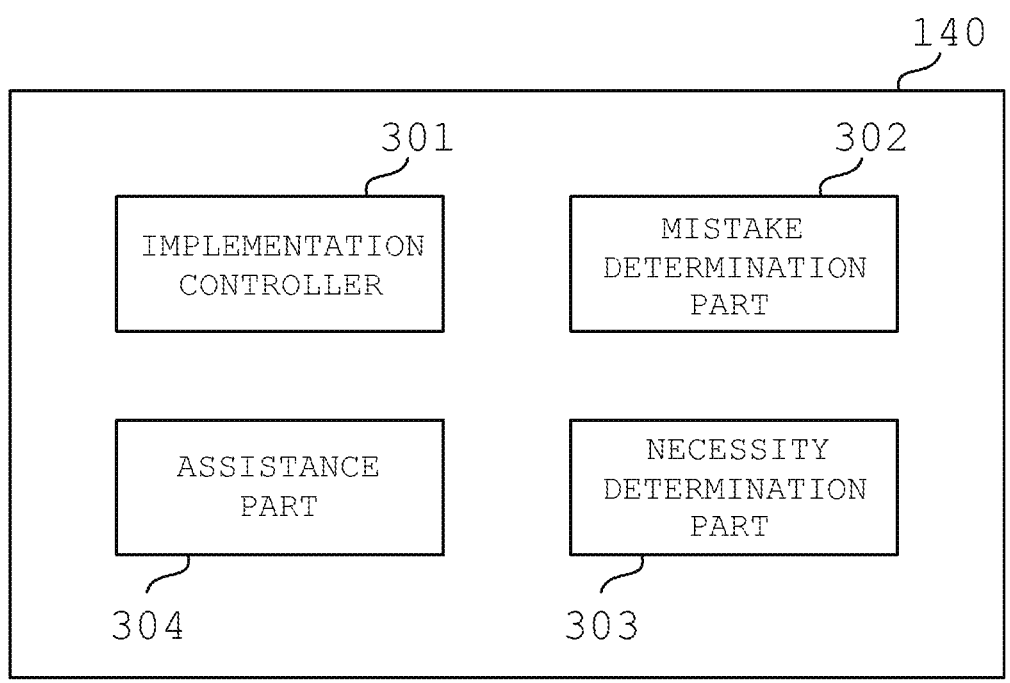
FIG. 9 is a block diagram showing the configuration of a content reproduction device.
Figure 10:
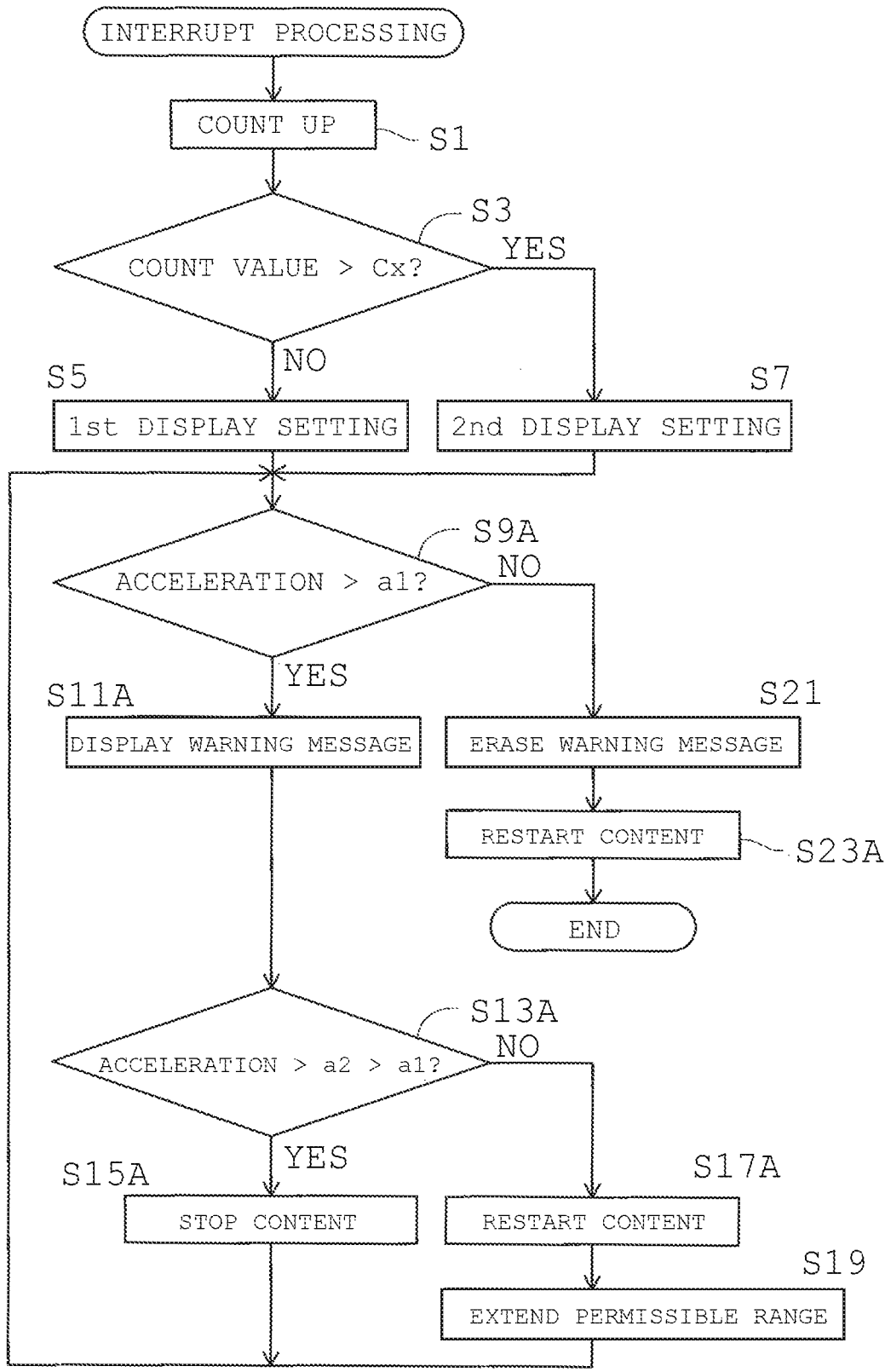
FIG. 10 is a flowchart showing interrupt processing performed by the content reproduction device in response to the occurrence of an acceleration on a vehicle as an example.

FIG. 9 is a block diagram showing the configuration of the content reproduction device. The configuration of the content reproduction device is realized by the CPU 140 in the AV control unit 3. As shown in FIG. 9, the content reproduction device includes an implementation controller 301 that reproduces the content, a mistake determination part 302, a necessity determination part 303, and an assistance part 304. The mistake determination part 302 determines a mistake in operation accepted by the input device. The necessity determination part 303 determines whether assistance to a user in operation is necessary based on a result of detection by the sensor. The assistance part 304 provides the assistance to the user. More specifically, if the necessity determination part 303 determines that the assistance is necessary, the assistance part 304 makes the mistake determination part 302 relax a determination criterion for determining a mistake in the operation. FIG. 10 is a flowchart showing interrupt processing performed by the content reproduction device in response to the occurrence of an acceleration on a vehicle as an example. Processes in FIG. 10 corresponding to those described by referring to FIG. 5 will not be described.

In an exemplary case described below, a content to be reproduced is a karaoke content. Regarding the karaoke content, a score is given by comparing the singing voice of a singer and a guide melody track. A score is given by comparing the singing voice and the tone (pitch) of a guide melody in units of notes of the guide melody track. More specifically, if the tone of the singing voice matches the tone of the guide melody track (falls within a permissible range) for a predetermined period or more, a high score is given. For this scoring, timing of tone change can be reflected in the score. Further, the score can be raised based on timing of tone change, or the presence of a technical aspect such as vibrato, cadence, or tone bending (a gentle transition from a low tone).

When the foregoing karaoke content is reproduced, the necessity determination part 303 determines whether the assistance to the user in singing (an example of operation) is necessary. This determination is made based on a result (such as an acceleration on the movable room, the amplitude of vibration, the presence or absence of conversation or external communication, or a noise volume) detected by a sensor installed on the movable room in response to a disturbance to be detected (such as acceleration or deceleration on a movable room, vibration at the movable room, conversation in the movable room, external communication, or extraneous noise). If the necessity determination part 303 determines that assistance is necessary, the assistance part 304 makes the mistake determination part 302 relax a determination criterion (a permissible range in which tone mismatch is permitted, for example) for determining a mistake in the singing.

More specifically, the necessity determination part 303 determines whether an output value indicating a result of detection by the sensor exceeds a first predetermined value a1 (see step S9A in FIG. 10). If the necessity determination part 303 determines that the output value exceeds the first predetermined value a1, the assistance part 304 makes the mistake determination part 302 relax the determination criterion. At this time, the CPU 140 can display a message (warning message) for alerting the user (in the case of a karaoke content, a singer) on a display screen on a display device (such as a display) (see step S11A in FIG. 10).

In the case of the karaoke content, the foregoing determination criterion is a permissible range in which tone mismatch is permitted (namely, a permissible range in which mismatch of timing of operation by the user is permitted). The assistance part 304 makes the mistake determination part 302 extend this permissible range.

If the output value is determined to exceed the first predetermined value a1, the necessity determination part 303 can further determine whether the output value exceeds a second predetermined value a2 larger than the first predetermined value a1 (see step S13A in FIG. 10). In this case, if the necessity determination part 303 determines that the output value exceeds the second predetermined value a2, the assistance part 304 can make the implementation controller 301 stop reproduction of the content (see step S15A in FIG. 10). At this time, the CPU 140 can display a message notifying the user of the stop of the content reproduction ("CONTENT REPRODUCTION BEING STOPPED!", for example) alone or together with a warning message on the display screen on the display device (such as a display).

If the output value is determined not to exceed the first predetermined value a1 in step S9A, the CPU 140 erases the warning message being displayed (step S21). And then, if implementation of the content has been stopped, the CPU 140 restarts implementation of the content (step S23A). If the output value is determined not to exceed the second predetermined value a2 in step S13A, and if implementation of the content has been stopped, the CPU 140 restarts implementation of the content (step S17A).

Like the musical instrument practice system described above, this content reproduction system provides the assistance to the user in operation in response to a result of detection by the sensor. Thus, even if the operation by the user is influenced by a disturbance to prohibit the user from performing the operation with intended timing, this operation is not determined to be false operation and the user is allowed to continue the operation. As a result, even on the occurrence of a disturbance acting to prohibit the operation by the user while the content is reproduced in a movable room, it still becomes possible to provide the content appropriately to the user.

What is claimed is:

1. A musical instrument practice system comprising:
   a movable room;
   a musical instrument to be played by a player for practice in the movable room and outputting playing data for the practice;
   a sensor installed on the movable room; and
   a playing practice implementation device that displays the substance of a practice content while implementing the practice content, and provides assistance to the player in response to a signal output from the sensor while associating the assistance with the playing data.

2. The musical instrument practice system according to claim 1, wherein in a case where the signal from the sensor exceeds a first predetermined value, the playing practice implementation device relaxes a determination about a playing mistake by the player.

3. The musical instrument practice system according to claim 1, wherein:
   the playing practice implementation device includes a display device that displays a playing mistake made by the player, and
   in a case where the signal from the sensor exceeds a first predetermined value, the playing practice implementation device controls the display device to display a warning indicating a playing mistake by the player.

4. The musical instrument practice system according to claim 1, wherein in a case where the signal from the sensor exceeds a first predetermined value, the playing practice implementation device issues a warning.

5. The musical instrument practice system according to claim 1, wherein in a case where the signal from the sensor exceeds a first predetermined value, the playing practice implementation device stops implementation of the practice content.

6. The musical instrument practice system according to claim 5, wherein in a case where the signal from the sensor falls below a second predetermined value, the playing practice implementation device restarts implementation of the practice content.

7. The musical instrument practice system according to claim 1, wherein:
   the playing practice implementation device is a portable information terminal, and
   the movable room is a vehicle.

8. The musical instrument practice system according to claim 1, wherein the musical instrument is configured to give an operation element of the musical instrument a function of remotely controlling the playing practice implementation device or a device installed in the movable room under a predetermined condition.

9. The musical instrument practice system according to claim 1, wherein the playing practice implementation device comprises:
   a communication interface that receives playing data from the musical instrument played by the player for practice in the movable room;
   an implementation controller that implements a practice content;
   a display device that displays substance of the practice content being implemented by the implementation controller; and
   wherein the implementation controller provides assistance to the player in response to a signal output from a sensor disposed in the movable room while associating the assistance with the playing data.

10. A content reproduction system comprising:
    an input device that accepts operation by a user responsive to a content;
    a sensor that detects a disturbance acting to disturb the operation; and
    a content reproduction device that reproduces the content in a movable room, and provides assistance to the user in response to a result of the detection by the sensor during reproduction of the content while associating the assistance with the operation accepted by the input device.

11. The content reproduction system according to claim 10, wherein the content reproduction device includes:
    at least one memory storing instructions; and
    at least one processor configured to implement the stored instructions and execute:
      an implementation control task that implements reproduction of the content;
      a mistake determination task that determines a mistake in the operation accepted by the input device;
      a necessity determination task that determines whether the assistance is necessary based on the result of the detection by the sensor; and
      an assistance task that provides the assistance by relaxing a determination criterion based on which the mistake determination task determines the mistake in a case where the necessity determination task determines that the assistance is necessary.

12. The content reproduction system according to claim 11, wherein:
the necessity determination task determines whether an output value indicating the result of the detection by the sensor exceeds a first predetermined value, and
in a case where the necessity determination task determines that the output value exceeds the first predetermined value, the assistance task relaxes the determination criterion.

13. The content reproduction system according to claim 12, wherein:
in a case where the output value is determined to exceed the first predetermined value, the necessity determination task further determines whether the output value exceeds a second predetermined value larger than the first predetermined value, and
in a case where the necessity determination task determines that the output value exceeds the second predetermined value, the assistance task stops reproduction of the content.

14. The content reproduction system according to claim 10, wherein the disturbance detected by the sensor is at least one of an acceleration on the movable room, vibration at the movable room, conversation in the movable room, external communication, or extraneous noise.

15. The content reproduction system according to claim 10, further comprising:
a display device that displays the content reproduced by the content reproduction device,
wherein the content reproduction device controls the display device to display an image in a scrolled fashion, the image being displayed for requesting the user to perform the operation using the input device in a timed fashion.

16. A content reproduction device comprising:
at least one memory storing instructions; and
at least one processor configured to implement the stored instructions and execute:
an implementation control task that implements reproduction of a content in a movable room;
a mistake determination task that determines a mistake in operation by a user;
a necessity determination task that determines whether assistance to the user is necessary based on a result of detection by a sensor that detects a disturbance acting to disturb the operation; and
an assistance task that provides the assistance by relaxing a determination criterion based on which the mistake determination task determines the mistake in a case where the necessity determination task determines that the assistance is necessary.

* * * * *